US008037055B2

(12) United States Patent
Brawer et al.

(10) Patent No.: US 8,037,055 B2
(45) Date of Patent: Oct. 11, 2011

(54) SITEMAP GENERATING CLIENT FOR WEB CRAWLER

(75) Inventors: Sascha B. Brawer, Berne (CH);
Maximilian Ibel, Pfaeffikon (CH);
Ralph Michael Keller, Zumikon (CH);
Narayanan Shivakumar, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/861,663

(22) Filed: Aug. 23, 2010

(65) Prior Publication Data
US 2010/0318508 A1 Dec. 16, 2010

Related U.S. Application Data

(63) Continuation of application No. 11/172,692, filed on Jun. 30, 2005, now Pat. No. 7,801,881.

(60) Provisional application No. 60/686,492, filed on May 31, 2005.

(51) Int. Cl.
G06F 7/00 (2006.01)
G06F 17/30 (2006.01)
(52) U.S. Cl. ........................................ 707/709; 707/802
(58) Field of Classification Search .................. 707/706, 707/709, 711, 741, 707, 708
See application file for complete search history.

(56) References Cited

U.S. PATENT DOCUMENTS

| 5,935,210 | A | 8/1999 | Stark ............................. 709/224 |
| 5,958,008 | A * | 9/1999 | Pogrebisky et al. ........... 709/223 |
| 6,124,966 | A | 9/2000 | Yokoyama .................... 359/339 |
| 6,144,959 | A | 11/2000 | Anderson et al. .................. 707/9 |
| 6,269,370 | B1 | 7/2001 | Kirsch ............................. 707/10 |
| 6,271,840 | B1 | 8/2001 | Finseth et al. ................. 345/349 |
| 6,285,999 | B1 | 9/2001 | Page .................................. 707/5 |
| 6,321,265 | B1 | 11/2001 | Najork et al. ................. 709/224 |
| 6,418,433 | B1 * | 7/2002 | Chakrabarti et al. ................. 1/1 |
| 6,421,724 | B1 | 7/2002 | Nickerson et al. ............. 709/224 |
| 6,424,966 | B1 * | 7/2002 | Meyerzon et al. ............ 707/610 |
| 6,516,337 | B1 * | 2/2003 | Tripp et al. .................... 709/202 |
| 6,525,748 | B1 * | 2/2003 | Belfiore et al. ................ 715/855 |
| 6,636,854 | B2 | 10/2003 | Dutta et al. ...................... 707/10 |
| 6,732,105 | B1 | 5/2004 | Watson, Jr. et al. ............. 707/10 |
| 6,957,383 | B1 | 10/2005 | Smith ........................... 715/501 |
| 6,976,053 | B1 | 12/2005 | Tripp et al. .................... 709/202 |
| 6,983,282 | B2 | 1/2006 | Stern et al. .................... 707/102 |
| 7,133,870 | B1 | 11/2006 | Tripp et al. ...................... 707/10 |

(Continued)

OTHER PUBLICATIONS

Clabo, S., Hermetic Sitemap Builder, A Search Engine Submission and Website Development Tool, http://www.hermetic.ch/smb/smb.htm, Jan. 7, 2010, 3 pages.

(Continued)

*Primary Examiner* — Kuen Lu
*Assistant Examiner* — Hexing Liu
(74) *Attorney, Agent, or Firm* — Morgan, Lewis & Bockius LLP

(57) ABSTRACT

Methods and systems for a sitemap generating client for web crawlers are described. The client accesses one or more sources of document information about the documents available on a website, such as the file system, access logs, or pre-made URL lists. Document information is extracted from the sources and one or more sitemaps are generated based on the extracted document information. A notification is transmitted to a remote computer, informing that the sitemap(s) are available for access and likely have been updated. If the remote computer is associated with a web crawler, the remote computer may access the sitemap(s) and use the sitemaps to schedule a crawl of documents included or available on the website.

30 Claims, 4 Drawing Sheets

U.S. PATENT DOCUMENTS

| | | | |
|---|---|---|---|
| 7,139,747 B1 | 11/2006 | Najork | 707/3 |
| 7,191,210 B2 | 3/2007 | Grossman | 709/203 |
| 7,774,782 B1 | 8/2010 | Popescu et al. | 718/104 |
| 7,844,610 B2 | 11/2010 | Hillis et al. | 707/740 |
| 2002/0032772 A1 | 3/2002 | Olstad et al. | 709/224 |
| 2002/0052928 A1* | 5/2002 | Stern et al. | 709/218 |
| 2002/0061029 A1* | 5/2002 | Dillon | 370/432 |
| 2002/0087515 A1 | 7/2002 | Swannack et al. | 707/2 |
| 2002/0138582 A1 | 9/2002 | Chandra et al. | 709/206 |
| 2003/0028896 A1 | 2/2003 | Swart et al. | 725/127 |
| 2004/0030683 A1 | 2/2004 | Evans et al. | 707/3 |
| 2004/0093327 A1 | 5/2004 | Anderson et al. | 707/3 |
| 2004/0122686 A1 | 6/2004 | Hill et al. | 705/1 |
| 2004/0158617 A1 | 8/2004 | Shanny et al. | 709/217 |
| 2004/0168066 A1 | 8/2004 | Alden | 713/182 |
| 2004/0221289 A1 | 11/2004 | D'Souza et al. | 718/102 |
| 2005/0060286 A1 | 3/2005 | Hansen et al. | 707/2 |
| 2005/0256865 A1 | 11/2005 | Ma et al. | 707/5 |
| 2006/0004691 A1* | 1/2006 | Sifry | 707/1 |
| 2006/0070022 A1 | 3/2006 | Ng et al. | 717/104.1 |
| 2006/0080405 A1 | 4/2006 | Gibson | 709/218 |
| 2006/0106866 A1 | 5/2006 | Green et al. | 707/104 |
| 2006/0212451 A1 | 9/2006 | Serdy, Jr. et al. | 707/10 |
| 2007/0011168 A1 | 1/2007 | Keohane et al. | 707/10 |
| 2008/0021904 A1 | 1/2008 | Garg et al. | 707/10 |

OTHER PUBLICATIONS

Microsoft Compute Dictionary, Fifth Edition, 2002, 3 pages.

Open Archives Initiative, "The Open Archives Initiative Protocol for Metadata Harvesting;" http://www.openarchives.org/OAI/openarchivesprotocol.html, 2004, 37 pages.

Sitemaps.org, "What are Sitemaps?" http://web.archive.org/web/20061205095241/http://sitemaps.org/, Nov. 16, 2006, 1 page.

SOAP Meets RSS, "RSS at Harvard Law," http://blogs.law.harvard,edu/tech/soapMeetsRss, Jul. 17, 2003, 3 pages.

Technorati, "Developers, Ping Configurations," http://web.archive.org/web/20040829035832/www.technorati.com/de . . . , 2004, 4pages.

XML-Sitemaps.com, "Build Your Site Map Online," http://www.xml-sitemaps.com, 2005, 2 pages.

Yahoo! Adopts Site Maps (urllist.txt), "The Optimizer—Weekly SEO News," http://www.increased-online-traffic.com/2005/08/yahoo-adopts-site-maps-urilisttxt.asp, Aug. 23, 2005, 5 pages.

Yahoo! Free Sitemaps: Submit Your Site, http://www.seroundtable.com/archives/002421.html, Aug. 23, 2005, 2 pages.

Yahoo Search Blog, "Archive for the 'Site Explorer' Category," http://www.ysearchblog.com/category/site-explorer/page/2/, Dec. 6, 2005, Jun. 2, 2006 and Feb. 26, 2007, 11 pages.

Yahoo! Sitemap Feed Submission, Antezeta, Seo & Wab Analytics Consulting, http://www.antezeta.com/yahoo/site-map-feed.html, Feb. 26, 2010, 7 pages.

* cited by examiner

SITEMAP GENERATING CLIENT FOR WEB CRAWLER

RELATED APPLICATIONS

This application is a continuation of U.S. patent application Ser. No. 11/172,692 filed Jun. 30, 2005, entitled "Sitemap Generating Client for Web Crawler," now U.S. Pat. No. 7,801,881, which application claims the benefit of U.S. Provisional Patent Application No. 60/686,492, filed May 31, 2005, titled "Sitemap Generating Client for Web Crawler," which applications are incorporated by reference herein in their entirety.

This application is related to U.S. patent application Ser. No. 11/172,764, filed Jun. 30, 2005, titled "Web Crawler Scheduler that Utilizes Sitemaps from Websites," now U.S. Pat. No. 7,769,742, which claims the benefit of U.S. Provisional Patent Application No. 60/686,494, filed May 31, 2005, titled "Web Crawler Scheduler that Utilizes Sitemaps from Websites," which applications are incorporated by reference herein in their entirety.

TECHNICAL FIELD

The disclosed embodiments relate generally to search engines. More particularly, the disclosed embodiments relate to a client that generates sitemaps for use by web crawlers.

BACKGROUND

A search engine is a tool that identifies documents, typically stored on hosts distributed over a network, which satisfy search queries specified by users. Web search engines work by storing information about a large number of documents (such as web pages) which they retrieve from the World Wide Web (WWW) via a web crawler. The web crawler follows links found in crawled documents so as to discover additional documents to download. This is also known as discovery-based crawling.

Discovery-based crawling has some shortcomings. One shortcoming is that the crawl coverage may be incomplete, as there may be documents that the crawler is not able to discover merely by following links. Also, the crawler might fail to recognize some links that are embedded in menus, JavaScript scripts, and other web-based application logic, such as forms that trigger database queries. Another shortcoming is that the crawler may not know if a document has changed since a prior crawl, and thus may be skipped during a current crawling cycle. Yet another shortcoming is that the crawler does not know when it should crawl a particular website and how much load to put on the website during the crawling process. Crawling a website during high traffic periods and/or excessive load during crawling can deplete network resources from the website, rendering the website less accessible to others.

SUMMARY

According to an aspect of the invention, a method of listing documents includes accessing one or more sources of document information, extracting the document information from the sources, generating a list of documents based on the document information, and transmitting a notification to a remote computer, the notification including an indication that the list is available for access.

BRIEF DESCRIPTION OF THE DRAWINGS

Like reference numerals refer to corresponding parts throughout the drawings.

DESCRIPTION OF EMBODIMENTS

A web server of a website generates a sitemap of URLs (Universal Resource Locators) or URIs (Universal Resource Identifiers) that may be crawled by a web crawler. The sitemap may also include metadata associated with the URLs and/or URIs included in the sitemaps. The web server sends a notification to a remote computer associated with a web crawler. In this context the web server may be considered to be the client and the web crawler is considered to be the server in a client-server relationship. The remote computer accesses the sitemap and uses the information included within the sitemap to identify documents stored at the web server to include in a crawl.

In context of search engines and network crawlers, the term "crawl" means to download and process documents so as to build an index or other listing of documents. "A crawl" is an iteration of a crawl process, during which a set of documents are downloaded and processed. The term "crawl" sometimes also means identifying and processing links in the downloaded documents so as to build a link map or other representation of links between the crawled documents. Typically, the purpose of a crawl is to compile the information in a set of documents for a search engine, thereby enabling the search engine to identify documents satisfying search queries.

Figure 1:
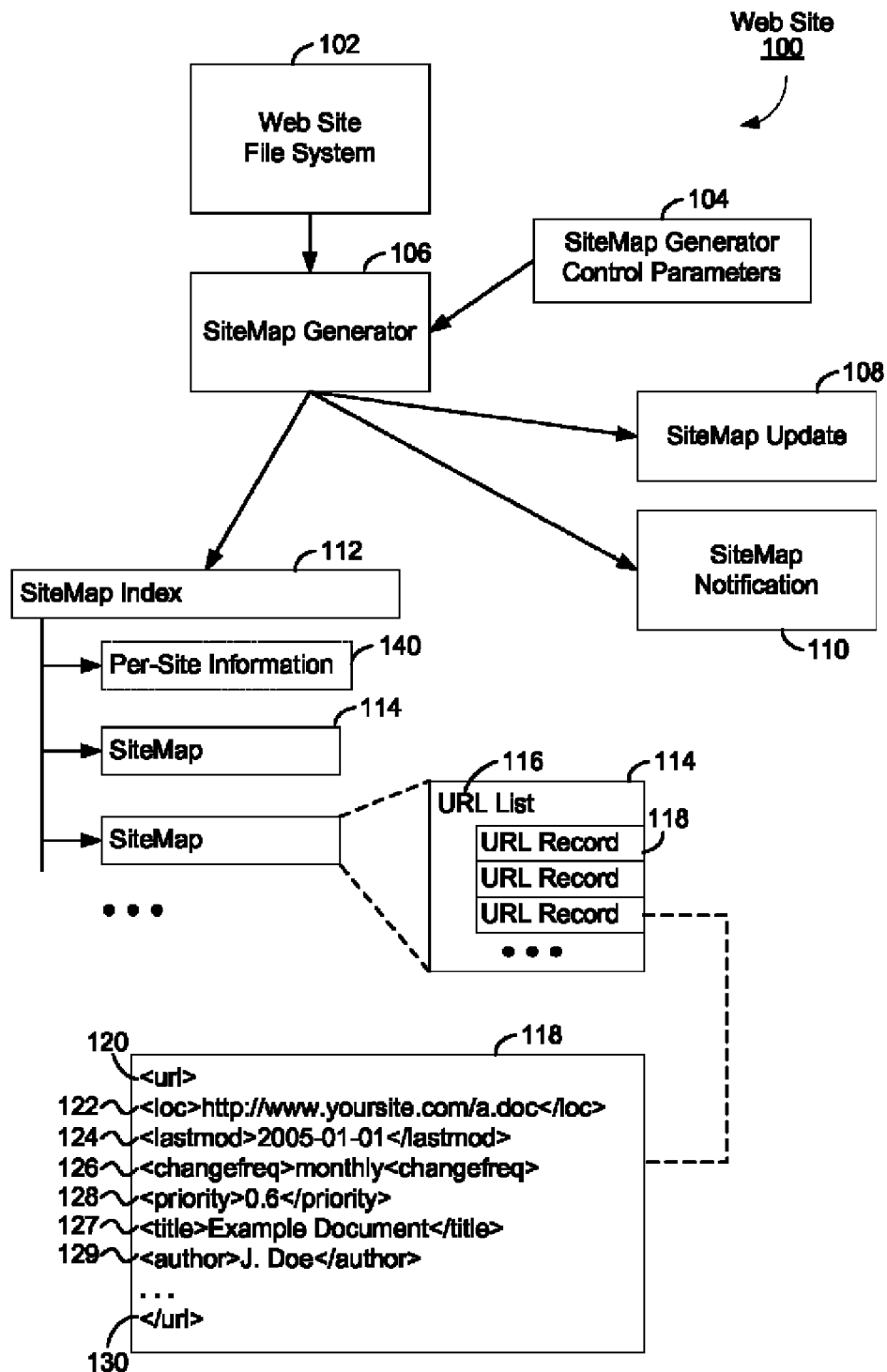
FIG. 1 is a conceptual diagram of a process for generating a sitemap for a website, according to some embodiments of the invention.

FIG. 1 is a block diagram illustrating a website 100, according to some embodiments of the invention. The website 100 includes a website file system 102, sitemap generator control parameters 104, a sitemap generator 106, a sitemap update module 108, a sitemap notification module 110, sitemaps 114, and sitemap indexes 112. The file system 102 may be implemented in some embodiments using any of a number of file systems, including distributed file systems in which files are stored on multiple computers. In other embodiments, the file system 102 may be implemented using a database or search engine that produces documents in response to queries. It should be appreciated, however, that FIG. 1 is intended more as functional description of the various features which may be present in a website than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers. As recognized by those of ordinary skill in the art, a website may be implemented on a single server, such as a web server, or on a plurality of servers, such as a plurality of web servers. The actual number of servers used to implement a website server and how features are allocated among them will vary from one implementation to another, and may depend in part on the amount of data traffic that the system must handle during peak usage periods as well as during average usage periods. For convenience of explanation, websites will be described below as if they are implemented on a single web server.

The website file system 102 organizes the documents that are stored at the web server. A document stored at the website may be any machine-readable file that includes text, graphics, video, audio, etc., or any combination thereof. Examples of documents that may be stored at a website include, without limitation, web pages, images, video files, audio files, Portable Document Format (PDF) files, plain text files, executable files, presentation files, spreadsheets, word processor documents, and so forth.

The documents stored at the website 100 may be organized in a hierarchal structure. That is, the documents are organized into a tree of nested directories, folders, or paths (hereinafter the "directory tree"). The directory tree includes a root directory/folder/path, and the root may have subdirectories/sub-folders/subpaths nested within. The subdirectories/sub-folders/subpaths may also have further subdirectories/sub-folders/subpaths nested within, thus forming a directory tree. Each document is stored in a directory/folder/path in the directory tree. Each directory/folder/path and each document is a node in the tree. The file system also stores metadata associated with the documents, such as a last modification date, a last access date, document permissions, and the like. In some embodiments, the file system may also include a database of documents and associated metadata. Documents in the database may be accessed by executing a query of the database as well as, or instead of, traversing the directory tree.

Each document stored at the website may be identified and/or located by a locator. In some embodiments, the locator is the Uniform Resource Locator (URL) of the document. In some other documents, alternative manners of identification (e.g., URIs) or addressing may be used. The URL of a document may be derived from its location in the file system. The URL of a document may be based on the directory/folder/path, or the location in a database, or on the query used to retrieve the document from the database in which the document is stored. That is, each document in a directory/folder/path or a database location may be mapped to an URL. In some embodiments, the URLs may be used by computers external to the website, such as remote computers associated with web crawlers, to access the documents in the file system that are open to external access. For convenience of explanation, the document locators are described below as if they are URLs.

The sitemap generator 106 generates sitemaps and, optionally, one or more sitemap indexes of the website. The sitemaps, further details of which are described below, may be used by web crawlers to schedule its crawls of documents stored at the web server. Sitemap indexes, further details of which are described below, encapsulate one or more sitemaps. The sitemap index may contain a list of sitemaps. The sitemap generator 106 generates sitemaps by accessing one or more sources of document information. In some embodiments, the sources of document information include the file system 102, access logs, pre-made URL lists, and content management systems. The sitemap generator may gather document information by simply accessing the website file system 102 and collecting information about any document found in the file system 102. For instance, the document information may be obtained from a directory structure that identifies all the files in the file system. The sitemap generator 106 may also gather document information by accessing the access logs (not shown) of the website. The access logs record accesses of documents by external computers. An access log may include the URLs of the accessed documents, identifiers of the computers accessing the documents, and the dates and times of the accesses. The sitemap generator 106 may also gather document information by accessing pre-made URL lists (not shown). The pre-made URL lists list URLs of documents that the website operator wishes to be crawled by web crawlers. The URL lists may be made by the website operator using the same format as that used for sitemaps, as described below.

If the documents in the website are managed via a content management system, the sitemap generator 106 may gather document information by interfacing with the content management system and accessing the information stored within the content management system. Content management systems are well known in the art and need not be further described.

The sitemap generator control parameters 104 include predefined parameters that control the generation of sitemaps. Further information regarding the sitemap generator control parameters 104 is described below, in relation to FIG. 3.

The sitemap generator 106 generates sitemaps 114 and possibly one or more sitemap indexes 112. The sitemap 114 and sitemap index 112 may be generated using any suitable format and language. In some embodiments, the sitemap is generated in Extensible Markup Language (XML) format, using predefined XML tags. In some other embodiments, other formats may be used, including but not limited to plain text files, comma-separated value files, and semicolon-separated value files. For convenience of description, sitemaps and sitemap indexes below are described as formatted using XML.

A sitemap index 112 is a document that lists one or more sitemaps 114. The sitemap generator 106, when generating sitemaps for the website, may generate multiple sitemaps, with each sitemap listing a subset of URLs of documents that may be crawled, rather than listing URLs of all documents that may be crawled in one sitemap. In such a situation, the sitemap generator 106 may also generate a sitemap index 112 to list the multiple sitemaps and their URLs. A sitemap index may include starting and ending tags (e.g., XML tags such as <sitemapindex> and </sitemapindex>, not shown in the Figures) defining the beginning and end of the sitemap index 112. The sitemap index also includes URLs of each sitemap listed in the sitemap index. The sitemap index may also include optional metadata for respective sitemap URLs in the sitemap index. For instance, the metadata may include a last modification date of the respective sitemap. Each sitemap URL and any respective associated metadata are enclosed by starting and ending tags that define the beginning and end of a sitemap record 114 in the sitemap index 112.

In addition to the list of sitemaps, in some embodiments a sitemap index may optionally contain a list of site-specific information 140 (also called "per-site information") that applies to an entire website. For example, a sitemap index may contain a list of time intervals and a rate at which the crawler should crawl the respective website (e.g., <crawl_rate from =08:00UTC to =17:00UTC>medium</
      crawl_rate>
    <crawl_rate from =17:00UTC to =8:00UTC>fast</crawl_
      rate>).

In other examples, a sitemap index contains geographic information identifying a geographic location associated with the website (e.g., <location>latitude, longitude</location>), and/or it may contain language information identifying one or more languages supported by or otherwise associated with the respective website (e.g., <language>German</language>). In some embodiments, per-site information may also be present in the sitemaps references in a sitemap index file. If both the sitemap index and a referenced sitemap contain per-site information for the same property (e.g., crawl rate), then the value specified in the sitemap overrides the value specified in the sitemap index. In other embodiments, per-site information may be specified in a sitemap index or sitemap using syntax other than the examples given here.

In one embodiment, the sitemap generator 106 of a website generates a new sitemap at regular intervals, such as daily or weekly. Each new sitemap generated, after a first (starting point) sitemap, only lists URLs that are new or modified since the prior sitemap was generated (i.e., have a creation date or modification date after the date that the last sitemap was generated). The term "date" is used here to mean date and time, and may be represented by a timestamp, such as an ISO 8601 compatible timestamp using UTC (coordinated universal time). In these embodiments, the sitemap index for the website lists all the sitemaps generated for the website. Optionally, a new starting point sitemap may be generated by the sitemap generator at larger intervals (e.g., weekly or monthly) than the intervals at which the update sitemaps are generated. Each time a new sitemap is generated and added to the sitemap index, a notification is sent to one or more search engines or crawlers.

A sitemap 114 is a document that lists the URLs of documents in a website that may be crawled by a web crawler. A sitemap 114 includes a list of URLs and, optionally, additional information, such as metadata, for respective listed URLs. A sitemap 114 may include starting and ending tags 116 that define the beginning and end of the sitemap. The sitemap includes one or more URL records 118. The beginning and end of each URL record 118 are defined by a starting tag 120 and an ending tag 130. Each URL record 118 includes the URL 122 of a document that may be crawled. A URL record 118 may also include optional metadata associated with the respective URL. The optional metadata may include one or more of the following: a last modification date 124 of the document specified by the URL, a change frequency 126 (also called the update rate) of the document specified by the URL, a document title 127, a document author 129, and a priority 128 of the document specified by the URL. The change frequency 126 and priority 128 may be specified by the website operator.

The change frequency 126 is a descriptor of how often a document's content is expected to change. The descriptor is one of a predefined set of valid descriptors. In some embodiments, the set of change frequency descriptors includes "always," "hourly," "daily," "weekly," "monthly," "yearly," and "never." The change frequency 126 provides a hint to the crawler as to how often the document changes and the crawler can use the hint to schedule crawls of the document accordingly. A crawler, however, may crawl the document in a way that is inconsistent with the specified change frequency. For example, a crawler may crawl a document marked as "hourly" less frequently than a document marked as "yearly." The actual crawl frequency of a document may be based on the document's importance (as represented by a score, such as PageRank), actual observed changes in the document (or lack thereof) as observed by the crawler, and other factors, as well as the change frequency specified in a sitemap.

The priority 128 is a value that specifies the relative priority of the document identified by the URL 122. The priority 128 may be the priority relative to other documents listed in the same sitemap 114, relative to other documents stored in the same web server as the document, or relative to all documents in the website. In some embodiments, the range of priority values is 0.0 to 1.0, inclusive, with 0.5 as the default value, 0.0 as the lowest relative priority, and 1.0 as the highest relative priority. In some other embodiments, other priority scales, such as 0 to 10, may be used. The priority may be used by a crawler to determine which documents in the website should be crawled first. The crawler may ignore or modify the priority values in a sitemap when those priority values fail to meet predefined criteria (e.g., a requirement that the priority values in a sitemap or set of sitemaps for a website have a predefined average value, such as 0.5). In some embodiments, the priority may also be used when indexing documents.

The sitemap generator 106 may also interact with a sitemap update module 108 and a sitemap notification module 110. The sitemap notification module 110 sends a notification to a remote computer associated with a web crawler whenever a new or updated sitemap is available at the website. The notification includes the URL of the sitemap, so that the remote computer can access the sitemap. If the website uses sitemap indexes, the notification, in some embodiments, includes just the URL of the sitemap index. The remote computer accesses the sitemap index and identifies the URLs of the sitemaps from the sitemap index. In some other embodiments, the notification may include the actual sitemap index, in which case the remote computer need not access the sitemap index at the website.

The sitemap update module 108 may generate a differential sitemap based on a difference between a previously generated sitemap and a current sitemap. Further information regarding differential sitemaps is described below, in relation to FIG. 6.

Figure 2:
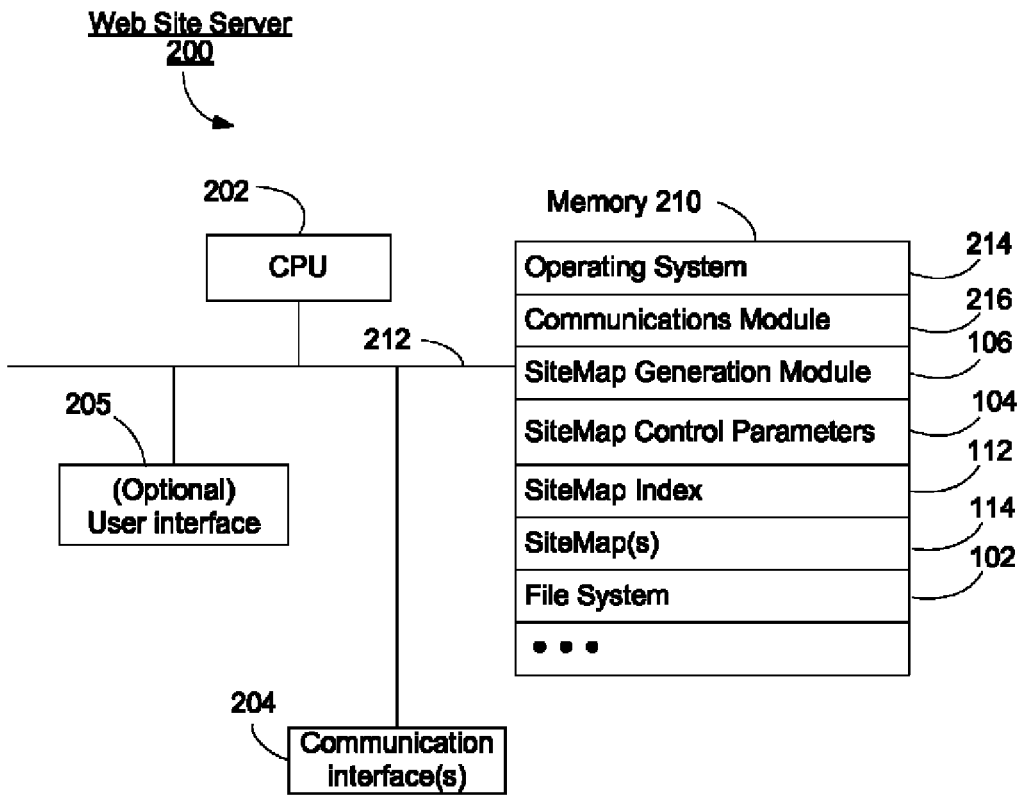
FIG. 2 is a block diagram illustrating a website server, according to some embodiments of the invention.

FIG. 2 is a block diagram illustrating a website server 200, according to some embodiments of the invention. The website server 200 (or "web server") typically includes one or more processing units (CPU's) 202, one or more network or other communications interfaces 204, memory 210, and one or more communication buses or signal lines 212 for interconnecting these components. The website server 200 optionally may include a user interface 205, which may comprise a display device, mouse, and/or a keyboard. The memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202 (e.g., network attached storage). Memory 210, or alternately the non-volatile memory device(s) within memory 210, comprises a non-transitory computer readable storage medium. In some embodiments, the memory 210 stores the following programs, modules and data structures, or a subset thereof:

- an operating system 214 that includes procedures for handling various basic system services and for performing hardware dependent tasks;
- a network communication module 216 that is used for connecting the website server 200 to other computers via the one or more communication network interfaces 204 and one or more communication networks, such as the Internet, other wide area networks, local area networks, metropolitan area networks, and so on;

a sitemap generation module 106 that generates sitemaps;
sitemap control parameters 104 that control or guide sitemap generation;
a sitemap index 112 that lists URLs of sitemaps stored at the website server 200;
one or more sitemap(s) 114 that list URLs of documents that may be crawled; and
a website file system 102 that stores and organizes documents.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 210 may store a subset of the modules and data structures identified above. Furthermore, memory 210 may store additional modules and data structures not described above.

Although FIG. 2 shows a "website server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a website server and how features are allocated among them will vary from one implementation to another, and may depend in part on the amount of data traffic that the system must handle during peak usage periods as well as during average usage periods.

Figure 3:
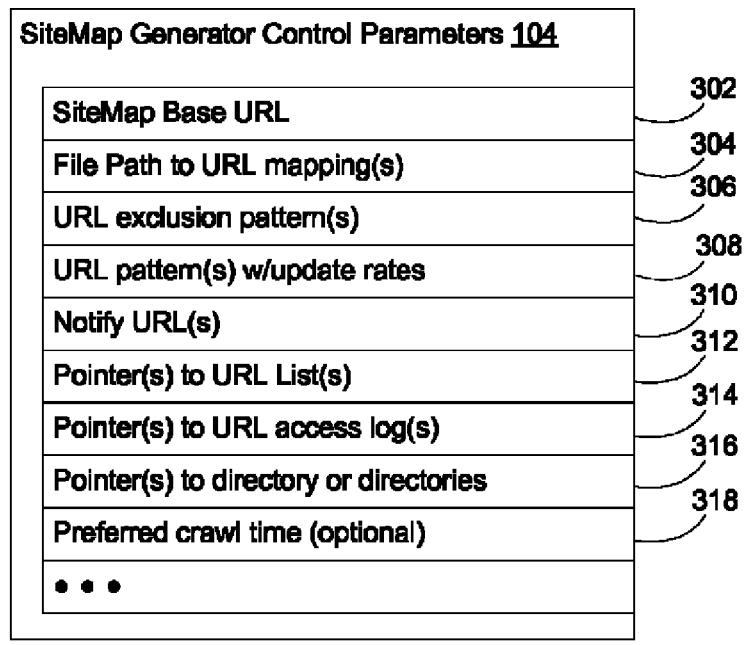
FIG. 3 is a block diagram illustrating a data structure for storing sitemap generator control parameters, according to some embodiments of the invention.

FIG. 3 is a block diagram illustrating a data structure for storing sitemap generator control parameters, according to some embodiments of the invention. The sitemap generator control parameters 104 control the generation of sitemaps and sitemap indexes. Each of the parameters may be specified by the operator of the website. The parameters may include one or more of the following:
one or more sitemap base URLs 302, which specifies the location(s) from which the sitemaps may be accessed by remote computers associated with web crawlers;
file path to URL mapping(s) 304, which map directories/paths/folders or database locations in the file system 102 to externally accessible URLs (an exemplary path to URL mapping is P:/A/B/*.*>www.website.com/qu/*.*);
URL exclusion pattern(s) 306, which specify classes of URLs that are to be excluded from inclusion in sitemaps (e.g., an exclusion pattern of "www.website.com/wa/*.pr1" would indicate that all "pr1" files in the "/wa" portion of www.website.com are to be excluded from the sitemap(s));
URL pattern(s) with update rates 308, which specify classes of URLs and update rates (change frequencies) for respective URL classes (e.g., www.website.com/qu/a*.pdf>daily would indicate that the files meeting the specified patterns are expected to be updated daily.
notify URL(s) 310, which specify the URLs of remote computers associated with web crawlers to which new sitemap notifications may be transmitted;
pointer(s) to URL list(s) 312, which point to pre-made URL lists;
pointer(s) to URL access log(s) 314, which point to URL access logs;
pointer(s) to directory or directories 316, which point to directories/folders/paths or database locations in the file system 102; and
(optional) preferred crawl time(s) 318, which specifies preferred times of the day for web crawlers to crawl the website.

It should be appreciated that the parameters listed above are merely exemplary and that additional and/or alternative parameters may be included.

Figure 4:
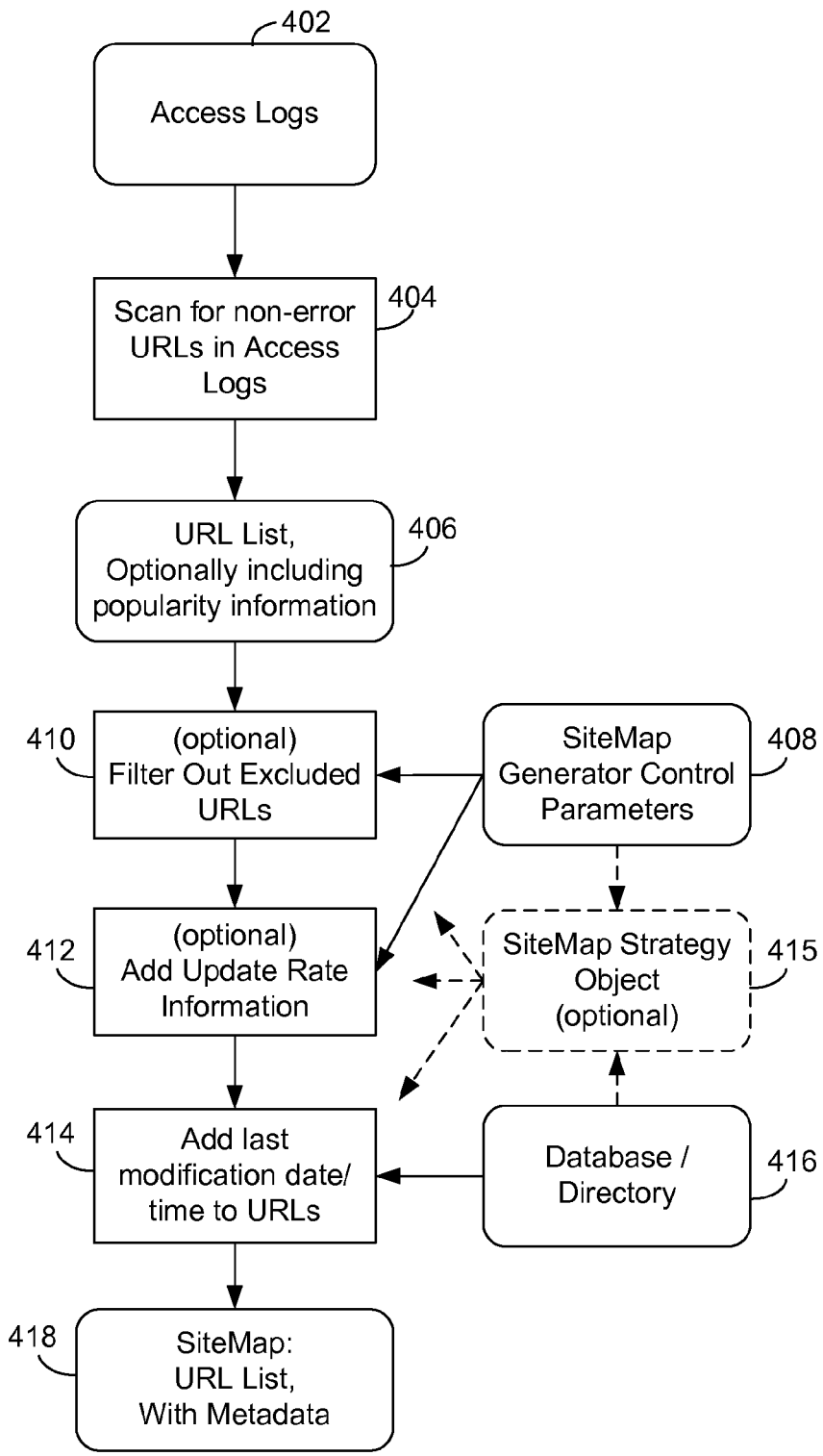
FIG. 4 is a flow chart illustrating a process for generating a sitemap, according to some embodiments of the invention.

FIG. 4 is a flow chart illustrating a process for generating a sitemap, according to some embodiments of the invention. As described above, a source of information about documents stored on the website is the access logs of the website. The access logs of the website are accessed (402). The access logs may be found by following pointers 314 to URL access logs. The access logs are scanned for non-error URLs (404). Non-error URLs are URLs that properly specify an existing and accessible document. Thus, for example, a URL for a document that is no longer on the website may be deemed an error URL. A list of URLs is generated (406). The list includes the non-error URLs found in the access logs. The list optionally may also include document popularity information derived from the access logs. The document popularity information may be determined based on the numbers of accesses each non-error URL has. The document popularity information serves as an additional hint of which documents are to be given a higher priority during crawling (e.g., scheduled to be crawled first, or more likely to be crawled than lower priority documents), based on which documents are in high demand (i.e., are accessed more often).

After the list of URLs is generated, the list may optionally be filtered for excluded URLs (410). The URL exclusion patterns 406 from the sitemap generator control parameters 104 may be used as the filter that is applied to the list of URLs (408). Alternately, URL exclusion patterns may be obtained elsewhere, or permanently encoded in a customized sitemap generator for the website. URLs in the list that match any of the URL exclusion patterns are removed from the list.

Optional update rate information may be added to the list of URLs, for the respective URLs in the list (412). In some embodiments, the update rates may be obtained from the sitemap generator control parameters 104, or more particularly, the URL pattern(s) with update rates 308 (408).

Last modification dates and times for the respective URLs in the list of URLs are added (414). The last modification dates may be obtained from the file system, which may be a database and/or a directory tree 416, as described above.

In an alternate embodiment, a sitemap strategy object 415 controls the filtering operation 410, update rate information adding operation 412 and the last modification date adding operation 414, using information obtained from a database 416 and/or the sitemap generator control parameters 408. In some embodiments, the sitemap strategy object determines which URLs (or URIs) to filter and which attributes to add to specific URLs (or URIs) by performing a database query on the underlying database 416.

The sitemap is generated from the resulting list of URLs, including any last modification date/time information, optional popularity information, and optional update rate information that has been included or obtained for the listed URLs (418). Within the sitemap, the metadata for the URLs listed in the sitemap comprises the last modification date/time information, optional popularity information, and optional update rate.

Figure 5:
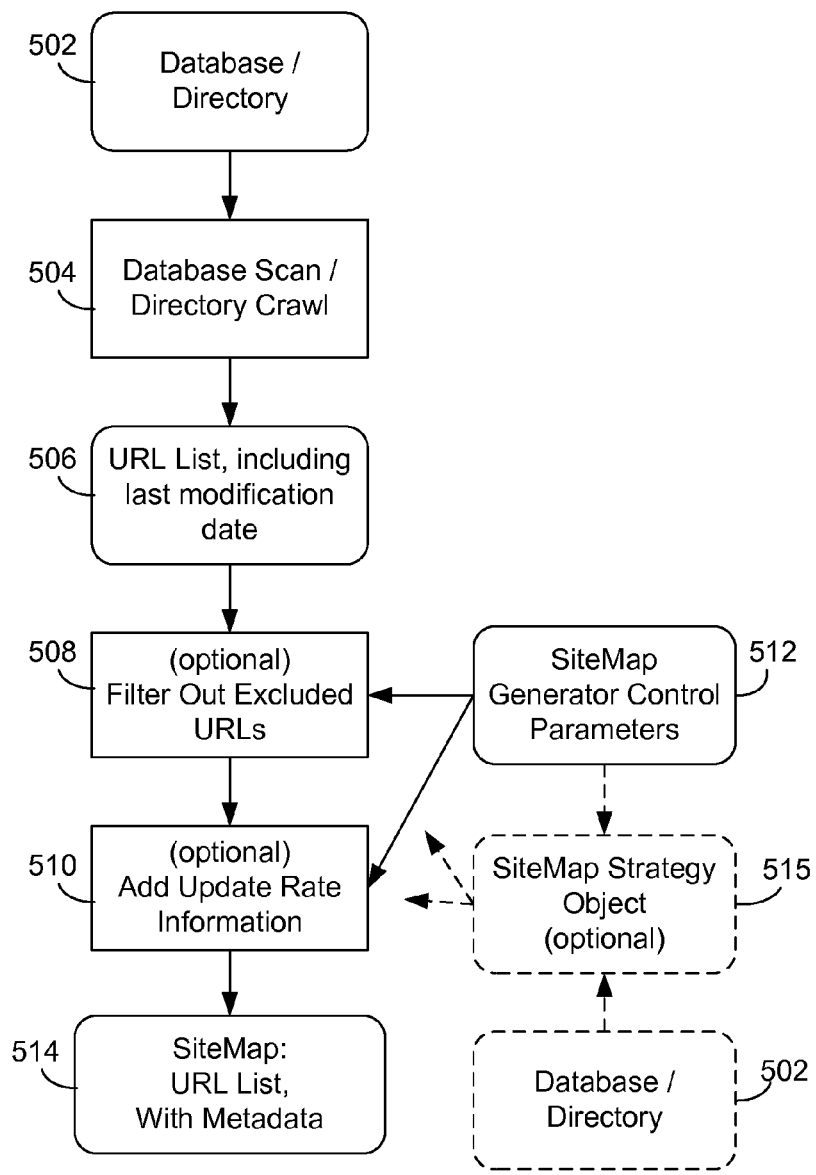
FIG. 5 is a flow chart illustrating another process for generating a sitemap, according to some embodiments of the invention.

FIG. 5 is a flow chart illustrating another process for generating a sitemap, according to some embodiments of the invention. The process of FIG. 5 is similar to that of FIG. 4, with the difference being that, in the process of FIG. 5, the initial source of document information is the file system database or directory tree (502), rather than access logs. A scan of the database or a traversal of the directory tree is performed (504). From the database scan or directory tree traversal, a list of URLs and associated last modification dates are obtained (506). The list may be optionally filtered for excluded URLs (508), using the URL exclusion patterns from the sitemap generator control parameters as the filters (512). Optionally, additional metadata, such as document update rate information associated with the respective URLs in the list of URLs may be added (510). The update rate information may be taken from the sitemap generator control parameters (512). The sitemap is generated from the list of non-excluded URLs, the last modification date information, and additional information such as the update rate information.

In an alternate embodiment, a sitemap strategy object 515 controls the filtering operation 508 and/or adding metadata 510 to the list of URLs or URIs in the sitemap 514 using information obtained from the underlying database 502 and/or the sitemap generator control parameters 512. In some embodiments, the sitemap strategy object 515 determines which URLs (or URIs) to filter and which attributes to add to specific URLs (or URIs) by performing a database query on the underlying database 502.

It should be appreciated that the sitemap generation processes illustrated in FIGS. 4 and 5 may be adapted to use alternative sources of document information and/or use multiple sources of document information. For example, the sitemap generator may initially extract URLs from one or more pre-made URL lists or from a content management system associated with the website. Regardless of the source from which the URLs are extracted, the sitemap generator may collect document metadata from as many of the sources of document information as needed. For example, the sitemap generator may extract URLs from pre-made URL lists, obtain the last modification dates from the file system and obtain document popularity information from the access logs. Any suitable combination of sources of document information may be used to generate the sitemaps.

Figure 6:
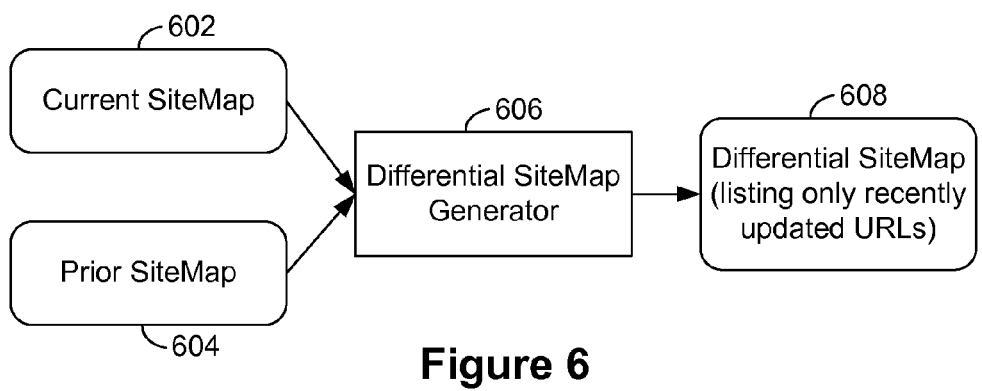
FIG. 6 is a flowchart illustrating a process for generating a differential sitemap, according to some embodiments of the invention.

FIG. 6 is a flowchart illustrating a process for generating a differential sitemap, according to some embodiments of the invention. A differential sitemap is a sitemap that is generated based on a difference between a previously generated sitemap and a current sitemap. The differential sitemap includes URLs that were not included in the previously generated sitemap and URLs that were included in the previously generated sitemap but which have new or updated metadata. For example, a URL with an updated last modification date would be included in the differential sitemap. The presence of an updated last modification date for the URL means that the document at the respective URL has been updated since the previously generated sitemap.

A current sitemap (602) and a previously generated sitemap (604) are processed by a differential sitemap generator, such as the sitemap update module 108 (606). The differences between the two sitemaps are ascertained and a differential sitemap is generated (608).

The sitemaps, if used by web crawlers, may lead to greater crawl coverage, since the sitemaps may include documents, such as documents that are accessible only by a database query, that are not accessible by following links. The sitemaps may also provide last modification dates. Web crawlers may use the last modification dates to determine if a document has changed, and may thereby avoid crawling documents whose contents have not changed. The use of sitemaps to avoid crawling unchanged documents can make web crawlers and network crawlers significantly more efficient. The sitemaps also include information from which web crawlers may determine which documents to crawl first and how much load to put on the web server during crawling. This, too, may help conserve network resources.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed by a website server system having one or more processors and memory storing one or more programs for execution by the one or more processors, comprising:
   accessing one or more sources of document information, wherein the one or more sources of document information are associated with a website server;
   extracting the document information including metadata from the sources;
   generating a sitemap of a website at the website server, the sitemap including a list of documents and corresponding metadata for each of a plurality of documents in the list of documents based on the document information;
   storing the sitemap at a location; and
   transmitting a notification from the website server to a remote computer associated with a web crawler system, the notification including information that identifies the location of the sitemap, the notification functioning as an indication that the sitemap is available for access.

2. The method of claim 1, wherein the document metadata information comprises document modification date information associated with the plurality of documents.

3. The method of claim 1, wherein the document metadata information comprises document access frequency information associated with the plurality of documents.

4. The method of claim 1, wherein the document metadata information comprises document priority information associated with the plurality of documents, wherein the document priority information indicates a crawling priority.

5. The method of claim 1, wherein the document metadata information comprises document update rate information associated with the plurality of documents.

6. The method of claim 1, wherein the sitemap metadata provides information for at least one of: prioritizing documents for crawling by a web crawler, and selecting documents for inclusion in a crawl by the web crawler.

7. The method of claim 1, wherein the sources of document information comprise at least one of the group consisting of: a file system, one or more access logs, and one or more document location lists.

8. The method of claim 1, wherein the document information comprises document location information and the plurality of documents are accessible to other computers via a network.

9. The method of claim 1, wherein generating the sitemap comprises generating a list of documents modified after a particular time.

10. The method of claim 1, further comprising generating a plurality of sitemaps, and generating an index referencing the plurality of sitemaps; wherein the notification identifies the index.

11. The method of claim 1, wherein the sitemap comprises a current sitemap, the method further comprising:
- determining a difference between the current sitemap and a prior sitemap; and
- generating a differential sitemap based on the difference.

12. A system, comprising:
- one or more processors and memory, the memory comprising one or more sources of document information; and
- one or more modules including instructions to:
  - access the sources of document information, wherein the sources are associated with a website server;
  - extract the document information including metadata from the sources;
  - generate a sitemap of a website at the website server, the sitemap including a list of documents and corresponding metadata for each of a plurality of documents in the list of documents based on the document information;
  - store the sitemap at a location; and
  - transmit a notification from the website server to a remote computer associated with a web crawler system, the notification including information that identifies the location of the sitemap, the notification functioning as an indication that the sitemap is available for access.

13. The system of claim 12, wherein the document metadata information comprises document modification date information associated with the plurality of documents.

14. The system of claim 12, wherein the document metadata information comprises document access frequency information associated with the plurality of documents.

15. The system of claim 12, wherein the document metadata information comprises document priority information associated with the plurality of documents, wherein the document priority information indicates a crawling priority.

16. The system of claim 12, wherein the document metadata information comprises document update rate information associated with the plurality of documents.

17. The system of claim 12, wherein the document information comprises document location information, and the plurality of documents are accessible to other computers via a network.

18. The system of claim 12, wherein the instructions to generate the sitemap include instructions to generate a list of documents modified after a particular time.

19. The system of claim 12, wherein the one or more modules further include instructions to generate a plurality of sitemaps, and to generate an index referencing the plurality of sitemaps; wherein the notification identifies the index.

20. The system of claim 12, wherein the sitemap comprises a current sitemap, the one or more modules further including instructions to:
- determine a difference between the current sitemap and a prior sitemap; and
- generate a differential sitemap based on the difference.

21. A non-transitory computer readable storage medium and one or more computer programs embedded therein, the computer programs comprising instructions, which when executed by a computer system, cause the computer system to:
- access one or more sources of document information, wherein the sources are associated with a website server;
- extract the document information including metadata from the sources;
- generate a sitemap of a website at the website server, the sitemap including a list of documents and corresponding metadata for each of a plurality of documents in the list of documents based on the document information;
- store the sitemap at a location; and
- transmit a notification from the website server to a remote computer associated with a web crawler system, the notification including information that identifies the location of the sitemap, the notification functioning as an indication that the sitemap is available for access.

22. The computer readable storage medium of claim 21, wherein the document metadata information comprises document modification date information associated with the plurality of documents.

23. The computer readable storage medium of claim 21, wherein the document metadata information comprises document access frequency information associated with the plurality of documents.

24. The computer readable storage medium of claim 21, wherein the document metadata information comprises document priority information associated with the plurality of documents, wherein the document priority information indicates a crawling priority.

25. The computer readable storage medium of claim 21, wherein the document metadata information comprises document update rate information associated with the plurality of documents.

26. The computer readable storage medium of claim 21, wherein the document information comprises document location information and the plurality of documents are accessible to other computers via a network.

27. The computer readable storage medium of claim 21, wherein the instructions, which when executed by a computer system, cause the computer system to generate the sitemap comprise instructions for generating a list of documents modified after a particular time.

28. The computer readable storage medium of claim 21, further comprising instructions, which when executed by a computer system, cause the computer system to generate a plurality of sitemaps, and generating an index referencing the plurality of sitemaps; wherein the notification identifies the index.

29. The computer readable storage medium of claim 21, wherein the sitemap comprises a current sitemap, the computer programs further comprising instructions, which when executed by a computer system, cause the computer system to:
- determine a difference between the current sitemap and a prior sitemap; and
- generate a differential sitemap based on the difference.

30. A system, comprising:
- one or more processors and memory, the memory comprising one or more sources of document information;
- means for accessing the sources of document information, wherein the sources are associated with a website server;
- means for extracting the document information including metadata from the sources;
- means for generating a sitemap of a website at the website server, the sitemap including a list of documents and corresponding metadata for each of a plurality of documents in the list of documents based on the document information;
- means for storing the sitemap at a location; and
- means for transmitting a notification from the website server to a remote computer associated with a web crawler system, the notification including information that identifies the location of the sitemap, the notification functioning as an indication that the sitemap is available for access.

* * * * *